United States Patent [19]

Fontana et al.

[11] Patent Number: 5,106,904
[45] Date of Patent: Apr. 21, 1992

[54] COMPOSITION CONTAINING AN AROMATIC COPOLYESTERCARBONATE AND AN INERT FILLER

[75] Inventors: Luca P. Fontana; Masataka Morioka, both of Evansville, Ind.

[73] Assignee: General Electric Company, Mt. Vernon, Ind.

[21] Appl. No.: 511,683

[22] Filed: Apr. 20, 1990

[51] Int. Cl.$^5$ .......................... C08J 5/08; C08K 3/40; C08L 33/04
[52] U.S. Cl. .................... 524/494; 524/495; 524/496; 528/196
[58] Field of Search ................ 528/196; 524/494, 495, 524/496

[56] References Cited

U.S. PATENT DOCUMENTS 4,487,917 12/1984 Mark .................................... 528/126
4,569,786 2/1986 Deguchi ............................. 524/495

Primary Examiner—Paul R. Michl
Assistant Examiner—U. K. Rajguru
Attorney, Agent, or Firm—Martin Barancik

[57] ABSTRACT

A composition comprising
a. an aromatic copolyestercarbonate comprising from about 2 to 30 mole percent ester content of an alpha omega aliphatic dicarboxylic acid ester having from about 8 to 20 carbon atoms, inclusive, admixed with
b. an inert filler in sufficient quantities to increase the flexural modulus of copolyestercarbonate.

19 Claims, No Drawings

COMPOSITION CONTAINING AN AROMATIC COPOLYESTERCARBONATE AND AN INERT FILLER

BACKGROUND OF THE INVENTION

Aromatic polycarbonates are amorphous polymers well known for their transparency, toughness, and impact resistance. The polymers are also generally known for their thermal properties.

As in most amorphous polymers, the various modulus measurements can be substantially altered and raised by the addition of an inert filler. However accompanying this property change are other changes which are not always desired. Unmodified aromatic polycarbonate which is molded, particularly injection molded, has a very glossy surface. When an inert filler is present, the luster of the surface is significantly lessened. Additionally, the presence of the filler brings about a certain surface roughness of the molded article. Clearly, as homogenous a surface as possible is desired.

A new polycarbonate like composition has been recently discovered. When it is combined with an inert filler, the resultant molded article has an improved surface gloss at 60° compared to normal polycarbonate in admixture with an inert filler. Additionally, the surface is not as rough as with normal polycarbonate. Still further, processability of the admixture is substantially improved as measured by melt flow and processing temperature.

SUMMARY OF THE INVENTION

In accordance with the invention, there is a composition comprising an aromatic copolyestercarbonate comprising from about 2 to 30 mole percent ester content of an alpha omega aliphatic dicarboxylic acid ester having from about 8 to 20 carbon atoms, inclusive, admixed with an inert filler in sufficient quantities to increase the flexural modulus of the copolyestercarbonate.

DETAILED DESCRIPTION OF THE INVENTION

Dihydric phenols which are useful in preparing the copolyestercarbonate of the invention may be represented by the general formula wherein:

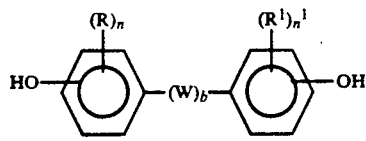
II

R is independently selected from halogen, monovalent hydrocarbon, and monovalent hydrocarbonoxy radicals;

$R^1$ is independently selected from halogen, monovalent hydrocarbon, and monovalent hydrocarbonoxy radicals;

W is selected from divalent hydrocarbon radicals, —S—, —S—S—, —O—,

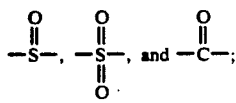

n and $n^1$ are independently selected from integers having a value of from 0 to 4 inclusive; and b is either zero or one.

The monovalent hydrocarbon radicals represented by R and $R^1$ include the alkyl, cycloalkyl, aryl, aralkyl and alkaryl radicals. The preferred alkyl radicals are those containing from 1 to about 12 carbon atoms. The preferred cycloalkyl radicals are those containing from 4 to about 8 ring carbon atoms. The preferred aryl radicals are those containing from 6 to 12 ring carbon atoms, i.e., phenyl, naphthyl, and biphenyl. The preferred alkaryl and aralkyl radicals are those containing from 7 to about 14 carbon atoms.

The preferred halogen radicals represented by R and $R^1$ are chlorine and bromine.

The divalent hydrocarbon radicals represented by W include the alkylene, alkylidene, cycloalkylene and cycloalkylidene radicals. The preferred alkylene radicals are those containing from 2 to about 30 carbon atoms. The preferred alkylidene radicals are those containing from 1 to about 30 carbon atoms. The preferred cycloalkylene and cycloalkylidene radicals are those containing from 6 to about 16 ring carbon atoms.

The monovalent hydrocarbonoxy radicals represented by R and $R^1$ may be represented by the formula —$OR^2$ wherein $R^2$ is a monovalent hydrocarbon radical of the type described hereinafore. Preferred monovalent hydrocarbonoxy radicals are the alkoxy and aryloxy radicals.

Some illustrative non-limiting examples of the dihydric phenols falling within the scope of Formula II include:
2,2-bis(4-hydroxyphenyl)propane (bisphenol-A);
2,2-bis(3,5-dibromo-4-hydroxyphenyl)propane;
2,2-bis(3,5-dimethyl-4-hydroxyphenyl)propane;
1,1-bis(4-hydroxyphenyl)cyclohexane;
1,1-bis(3,5-dimethyl-4-hydroxyphenyl)cyclohexane;
1,1-bis(4-hydroxyphenyl)decane;
1,4-bis(4-hydroxyphenyl)propane;
1,1-bis(4-hydroxyphenyl)cyclododecane;
1,1-bis(3,5-dimethyl-4-hydroxyphenyl)cyclododecane;
4,4-dihydroxydiphenyl ether;
4,4-thiodiphenol;
4,4-dihydroxy-3,3-dichlorodiphenyl ether; and
4,4-dihydroxy-2,5-dihydroxydiphenyl ether.

Other useful dihydric phenols which are also suitable for use in the preparation of the above polycarbonates are disclosed in U.S. Pat. Nos. 2,999,835; 3,028,365; 3,334,154; and 4,131,575, all of which are incorporated herein by reference.

The carbonate precursor utilized in the invention can be any of the standard carbonate precursors such as phosgene, diphenyl carbonate and the like. When using an interfacial process for example a bischloroformate process it is also preferred to use a standard catalyst system well known in the synthesis of polycarbonates and copolyestercarbonates. A typical catalyst system is that of an amine such as tertiary amine, amidine or guanidine. Tertiary amines are generally employed in such reactions. Trialkyalmines such as triethylamine are generally preferred.

The monomer which supplies the ester units in the copolyestercarbonate is an aliphatic alpha omega dicarboxylic acid or ester precursor from 9 to about 20 carbon atoms preferably 10 to 12 carbon atoms. The aliphatic system is normal, branched or cyclic. Examples of the system include sebacic acid, dodecanedioic acid C14, C18 and C20 diacids. The normal saturated aliphatic alpha omega dicarboxylic acids are preferred. Sebacic and dodecanedioic acid are most preferred. Mixtures of the diacids can also be employed. It should be noted that although referred to as diacids, any ester precursor can be employed such as acid halides, preferably acid chloride, diaromatic ester of the diacid such as diphenyl, for example the diphenylester of sebacic acid. With reference to the carbon atom number earlier mentioned, this does not include any carbon atoms which may be included in the ester precursor portion, for example diphenyl.

The copolyestercarbonates of the invention can be prepared by the known methods, for example those appearing in Quinn U.S. Pat. No. 4,238,596 and Quinn and Markezich U.S. Pat. No. 4,238,597. Examples of such processes include the formation of acid halides prior to the reaction of the ester forming group with the dihydric phenol and then followed by phosgenation. Still further, the basic solution process of Goldberg in the U.S. Pat. No. 3,169,121 reference utilizing a pyridine solvent can also be employed while also using the dicarboxylic acid per se. A melt process utilizing the diesters of the alpha omega dicarboxylic acids can also be employed. An example of such a compound is the diphenylester of sebacic acid.

After substantial experimentation, it has been found that a preferred process for making the copolyestercarbonates of this invention exists. The process of Kochanowski, U.S. Pat. No. 4,286,083 (083) was initially utilized and then improved upon. It was found that lower diacids such as adipic acid were not incorporated into the polymer backbone to any great extent. Rather, one had to go up to higher carbon atom dicarboxylic acids before any significant incorporation of diacid into the backbone was observed. We have found that the diacid is preferentially introduced as the preformed salt, preferably an alkali metal such as sodium into the interfacial reaction reactor. The dihydric phenol is also present. The water phase is maintained at an alkaline pH preferably from about 8 to 9 for most of the phosgenation period and then raising the pH to a level of about 10 to 11 for the remainder of the phosgenation time period which is generally a minimum of about 5%.

In order to control molecular weight, it is standard practice to utilize a chain stopping agent which is a monofunctional compound. This compound when reacting with the appropriate monomer provides a nonreactive end. Therefore the quantity of chain stopping compound controls the molecular weight of the polymer. Bulkier chain terminators than phenol should provide substantially better physical properties such as low temperature impact. Examples of these bulkier substituents include paratertiarybutylphenol, isononyl phenol, isooctyl phenol, cumyl phenols such as meta and paracumyl phenol, preferably paracumyl phenol, as well as chromanyl compounds such as Chroman I.

The copolyestercarbonate of this invention with the standard endcapping reagent possesses a substantially lowered glass transition temperature, Tg, therefore providing processability at a lower temperature. Surprisingly accompanying this low temperature processability are substantially equivalent physical properties as a standard polycarbonate of the same intrinsic viscosity as the inventive composition and very high flow rates. When utilizing the bulkier endgroups, it is possible to achieve even lower molecular weight copolyestercarbonate while maintaining excellent physical properties such as aged impact resistance and/or low temperature impact resistance while having a very high flow rate.

The aliphatic alpha omega dicarboxylic acid ester is present in the copolyestercarbonate in quantities from about 2 to 30 mole percent, based on the dihydric phenol. Generally with quantities below about 2 mole percent the Tg is insufficiently lowered and significantly altered flow rate is not observed. Above about 30 mole percent, the physical properties of the copolyestercarbonate are significantly hindered in comparison to the polycarbonate without the aliphatic ester linkages. Preferred mole percents of aliphatic alpha omega dicarboxylic acid ester are from about 5 to 25 and more preferably about 7 to 20 mole percent of the dihydric phenol.

The weight average molecular weight of the copolyestercarbonate can generally vary from about 10,000 to about 100,000 as measured by GPC, using a polystyrene standard corrected for polycarbonate. A preferred weight average molecular weight is from about 18,000 to about 40,000. The copolyestercarbonate comprises the following structural units

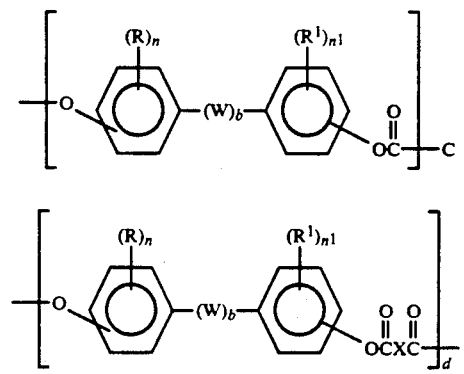

Figure 2 where R, $R^1$, n, $n^1$, W and b have been previously described and X is an aliphatic grouping of about 6 to about 18 carbon atoms, inclusive. The d repeating unit is present in the copolyestercarbonate in from about 2 to 30 mole percent of the total of the repeating units c+d, X is preferably about 7 to 16 carbon atoms, inclusive. The aliphatic system is preferably saturated and is normal, branched, cyclic or alkylene substituted cyclic. The mole percent of d is preferably about 5 to 25 and more preferably about 7 to 20 mole percent. For example, when 5 moles of bisphenol-A reacts completely with 4 moles of phosgene and 1 mole of dodecanedioic acid, the resulting copolyestercarbonate is said to have 20 mole percent ester content. That is, the d unit is 20 mole percent of the c+d units.

Any inert filler which can raise the flexural modulus of the copolyestercarbonate can be employed. Examples of such inert fillers include glass, carbon, ceramics, polyaramides and other materials. Ordinarily active fillers such as clays, mica and the like can be employed if they are passivated and made inert. Fibrous materials are preferred. Glass fibers are more preferred. Generally, a minimum of about 5 wt. % of the inert filler as measured by copolyestercarbonate plus inert filler should be employed so as to obtain improvement of flexural modulus. A maximum of about 60 wt. % of the inert filler can be employed. Above that quantity does not usually bring about additional improvements in flexural modulus and creates a composition which is difficult to process because of abrasiveness. Preferably 7 to 40 wt. % of inert filler is employed, more preferably 10 to 30 wt. %.

The composition of the invention can be compound in the usual manner, for example by Brabender mixer or compounding extruder.

Extrusion and molding can be carried out at temperatures lower than typical polycarbonate processing temperature. For example, extrusion can be carried out at 220° to 310° C., preferably 250° to 280° C. and injection molding at 220° to 315° C., preferred at 280°–310° C.

Below are examples of the invention. These examples are intended to illustrate the broad scope of the invention and not narrow the scope of the invention and inventive concept.

PREPARATION

Preparation of Copolyestercarbonate with Dodecanedioic Acid

The disodium salt of dodecanedioic acid (DDDA) was generated by dissolving the free acid (7.2 g, 31 mmol) and NaOH pellets (2.7 g, 68 mmol) in water (180 mL).

A 2000 mL five neck Morton flask equipped with a bottom outlet was fitted with a mechanical stirrer, a pH probe, an aqueous sodium hydroxide (50%) inlet tube, a Claisen adapter to which a dry ice condenser was attached, and a gas inlet tube. The flask was charged with bisphenol A (71 g, 311 mmol), triethylamine (0.9 mL), p-cumylphenol (2.0 g, 9 mmol), methylene chloride (220 mL), and the disodium salt solution of DDDA described above. Then phosgene was introduced at a rate of 2 g/min while the pH was maintained at 8 by addition of caustic for 10 minutes. The pH was then raised and maintained at around 10.5 while phosgene addition continued for 10 additional minutes. The total amount of phosgene added was 40 g (400 mmol). The pH was adjusted to 11–11.5 and the organic phase was separated from the brine layer, washed with 2% hydrochloric acid, (3×300 mL), and with deionized water (5×300 mL).

The methylene chloride solution was dried (MgSO$_4$), filtered, and then precipitated into methanol (1500 mL). The resin was washed with methanol (1×500 mL) and deionized water (4×500 mL), and dried at 110° C. for 15 hours.

EXAMPLES 1–4

Utilizing the procedure for preparing the copolyestercarbonate with 10 mole % dodecanedioate as made in the preparation above, various copolyestercarbonates (PEC) with certain intrinsic viscosities were made. These copolyestercarbonates were extruded with various quantities of Fiberglass 415 CA glass fiber obtained from Owens Corning. The dimensions of the glass fiber were 13 microns in diameter and 3/16 inches in length. They were fed to the extruder as bundles which had binders. No glass sizing was present. The intrinsic viscosity at 25° C. in methylene chloride of the copolyestercarbonate was 0.516. In a similar manner, a composition utilizing bisphenol-A polycarbonate of the same or closely similar intrinsic viscosity were admixed with the same glass fiber. In each of the compositions the wt. % glass fiber was 9% of the total of glass fiber plus polymer.

In each of the examples, the extruded pellets were molded at the stated temperature into appropriate test pieces. Gloss at 60° was measured in accordance with ASTM D523. The RMS (root mean square) measurement is a measure of surface roughness. The higher the number the rougher and more sizeable irregularities in the surface of the molded article. This measurement is done by utilizing a Surface Indicator, Model 13-1350-00 manufactured by Federal Products Corporation. A digital readout Model 21-1360-01 was also employed. Below are the results:

TABLE 1

| Cylinder Set Temperature Mold Temp °C. | RMS PEC | RMS PC | Gloss 60 PEC | Gloss 60 PC |
|---|---|---|---|---|
| 300/82 | 22 | — | 74 | — |
| 300/93 | 18 | 28 | 78 | 67 |
| 300/104 | 14 | 28 | 86 | 71 |
| 300/116 | 10 | 23 | 89 | 75 |

The data show that the RMS is substantially lower for the copolyestercarbonate admixture than the corresponding polycarbonate admixture. The gloss at 60° is substantially higher for the copolyestercarbonate admixture. At steadily increasing mold temperatures the RMS decrease and the gloss at 60° increases in each case, however the advantage of the copolyestercarbonate is maintained.

EXAMPLE 5

A 10 mole % dodecanedioate ester bisphenol-A copolyestercarbonate and a bisphenol-A polycarbonate were prepared with the intrinsic viscosity at 25° C. in methylene chloride of about 0.50 to 0.52. To each of these polymers was added 9 wt. % of Owens Corning Fiber Glass 415 CA as measured by polymer plus glass and small quantities of titanium dioxide (0.9 wt. %), carbon black (0.038 wt. %), inorganic pigment (0.31 wt. %) and ultraviolet inhibiting additives, all wt. % measured as % polymer plus glass. The polycarbonate admixture was extruded at 300° C. The copolyestercarbonate admixture was extruded at 260° C. Various test pieces of the admixture were molded at 300° C. The following ASTM tests were made on the molded articles.

ASTM D256—Unnotched and notched Izod
ASTM D638—Tensile Yield
ASTM D638—Tensile Break
ASTM D790—Flexural Yield
ASTM D790—Flexural Modulus
ASTM D648—Distortion Temperature Under Load
Below are the results:

TABLE 2

| | PC | PEC |
|---|---|---|
| 125 UN Izod (Kgf · cm/cm) | 81 | 101 |
| 125 Izod (Kgf · cm/cm) | 7.6 | 9.3 |
| Tensile Y (Kg/cm$^2$) | 680 | 630 |
| Tensile B (Kg/cm$^2$) | 520 | 460 |
| Flexural Y (Kg/cm$^2$) | 1080 | 977 |
| Flexural M (Kg/cm$^2$) | 31600 | 29600 |
| DTUL @ 264 (C) | 273 | 241 |
| RMS | 42 | 24 |
| Gloss 60° | 67 | 78 |

As is observed from the data, the PEC admixtures maintain essentially the same properties as the standard polycarbonate admixture except that the thermal resistance as measured by DTUL is lowered.

EXAMPLE 6

Two different 9% glass filled polymer admixtures are prepared as in Example 5. the copolyestercarbonate having a Mw of 28,400 and the polycarbonate having a Mw of 27,700. The admixtures are extruded at 300° C. and articles molded at 315° C. for the test below. The UL-94 flame resistant values are measured on appropriate test pieces of various thickness. The Kasha Index (KI), as measurement of processability of the composition is measured according to Miller U.S. Pat. No. 4,465,820, column 4, lines 15 to 35. Below are the results:

TABLE 3

|  | PEC | PC |
|---|---|---|
| KI 6 min. | 4110 | 9220 |
| UL 94 | | |
| 125 mil | V1 | V0 |
| 90 mil | V2 | V1 |
| 60 mil | B | V2 |

The data demonstrate that the admixture of the invention is substantially easier to process as measured by its melt viscosity and is less flame resistant.

What is claimed is:

1. A composition comprising
   a. an aromatic copolyestercarbonate comprising from about 2 to 30 mole percent ester content of an alpha omega aliphatic dicarboxylic acid ester having from about 8 to 20 carbon atoms, inclusive, admixed with
   b. an inert filler in sufficient quantities to increase the flexural modulus of the copolyestercarbonate.

2. The composition in accordance with claim 1 wherein the ester content is from about 5 to 25 mole percent.

3. The composition in accordance with claim 2 wherein the ester content is from about 7 to 20 mole percent.

4. The composition in accordance with claim 1 wherein the aliphatic dicarboxylic acid ester is saturated.

5. The composition in accordance with claim 4 wherein the dicarboxylic acid ester is nine, ten or twelve carbon atoms in length.

6. The composition in accordance with claim 4 wherein the aromatic copolyestercarbonate is bisphenol-A copolyestercarbonate.

7. The composition in accordance with claim 6 wherein the ester content is from 7 to 20 mole percent.

8. The composition in accordance with claim 1 wherein the inert filler is fibrous.

9. The composition in accordance with claim 1 wherein the inert filler is glass or carbon.

10. The composition in accordance with claim 9 wherein the inert filler is glass.

11. The composition in accordance with claim 8 wherein the inert filler is glass.

12. The composition in accordance with claim 11 wherein the aliphatic dicarboxylic acid ester is saturated.

13. The composition in accordance with claim 12 wherein the aliphatic dicarboxylic acid is nine, ten or twelve carbon atoms.

14. The composition in accordance with claim 13 wherein the aromatic copolyestercarbonate is bisphenol-A copolyestercarbonate.

15. The composition in accordance with claim 14 wherein the ester content is about 7 to 25 mole percent.

16. The composition in accordance with claim 1 wherein the quantity of filler is from 5 to about 60 wt. % of the copolyestercarbonate plus filler.

17. The composition in accordance with claim 7 wherein the quantity of filler is from 5 to about 60 wt. % of the copolyestercarbonate plus filler.

18. The composition in accordance with claim 15 wherein the quantity of filler is from 5 to about 60 wt. % of the copolyestercarbonate plus filler.

19. A composition comprising
   a. a copolyestercarbonate comprising

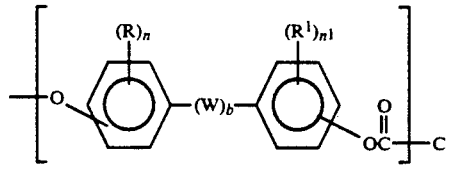

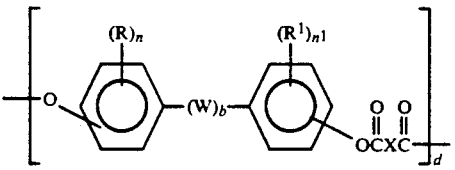

wherein:
R is independently selected from halogen, monovalent hydrocarbon, and monovalent hydrocarbonoxy radicals;
$R^1$ is independently selected from halogen, monovalent hydrocarbon, and monovalent hydrocarbonoxy radicals;
W is selected from divalent hydrocarbon radicals, —S—, —S—S—, —O—,

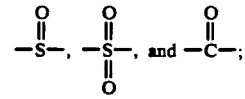

n and $n^1$ are independently selected from integers having a value of from 0 to 4 inclusive;
b is either zero or one;
X is an aliphatic group of about 6 to 18 carbon atoms, inclusive;
d is from about 2 to 30 mole percent of the total units c+d; and
in admixture with
   b. an inert filler in sufficient quantities to increase the flexural modulus of the copolyestercarbonate.

* * * * *